W. H. MUZZY & F. L. FULLER.
ATTACHMENT FOR CASH REGISTERS.
APPLICATION FILED FEB. 20, 1911.
1,161,069.
Patented Nov. 23, 1915.
4 SHEETS—SHEET 1.
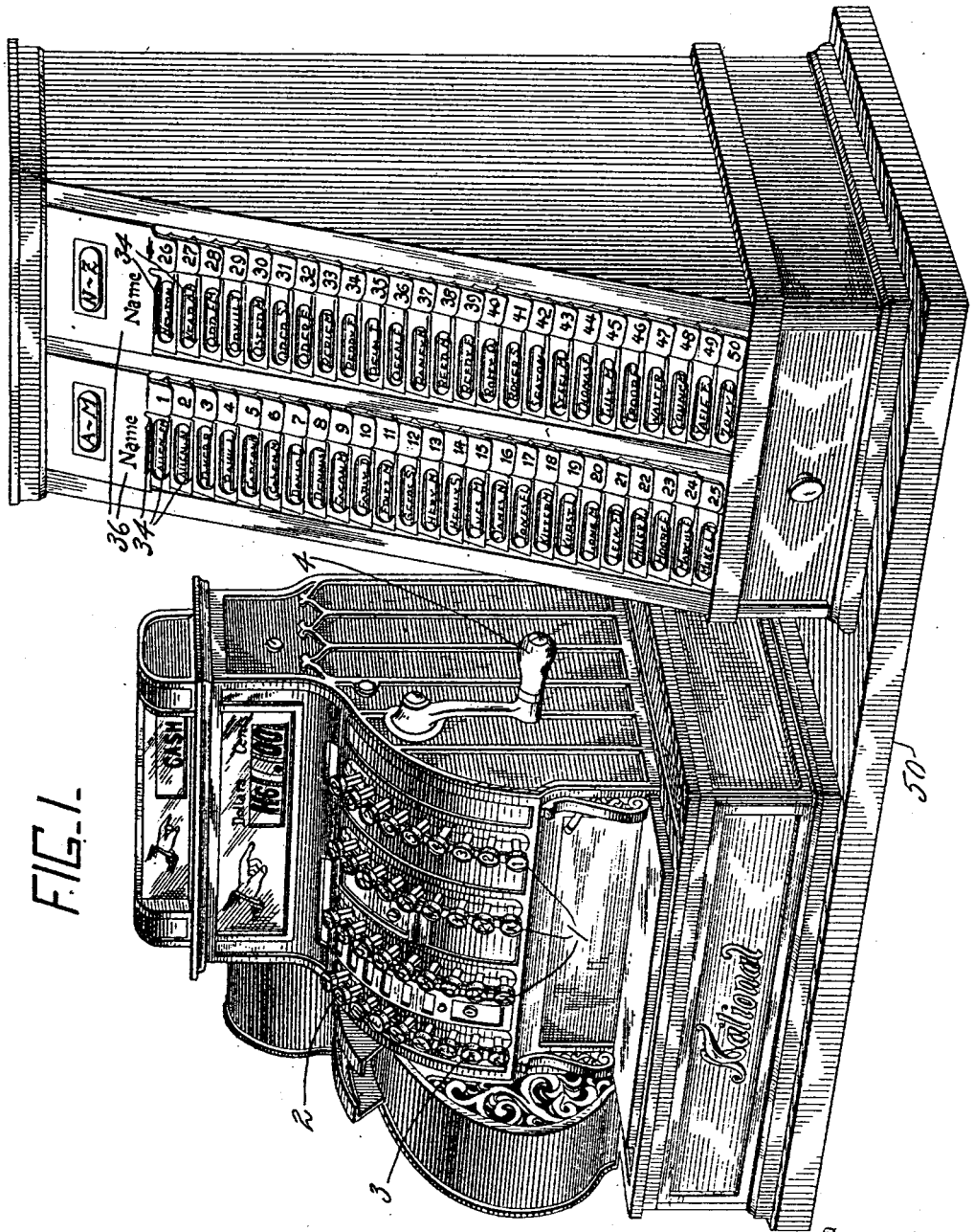

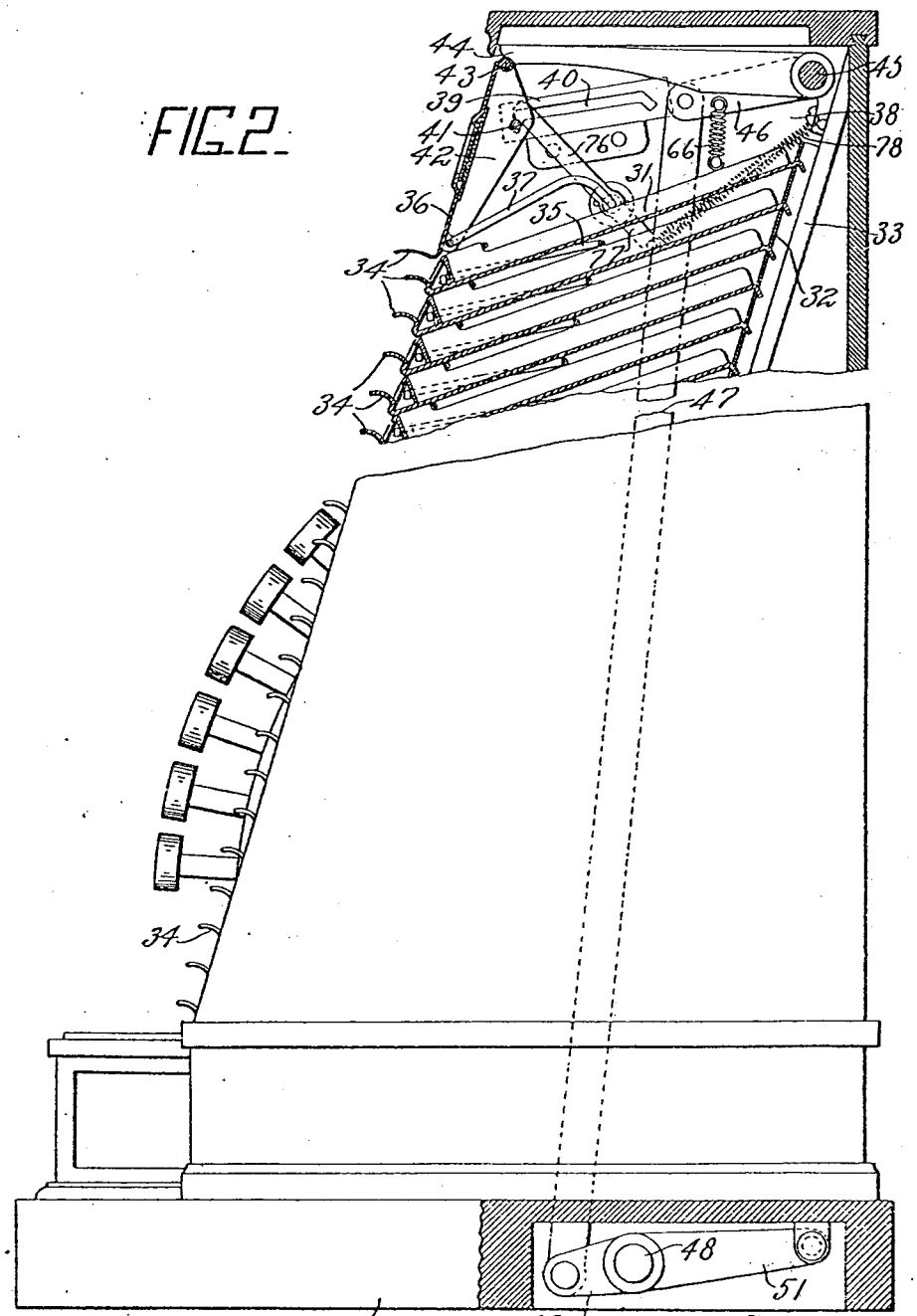

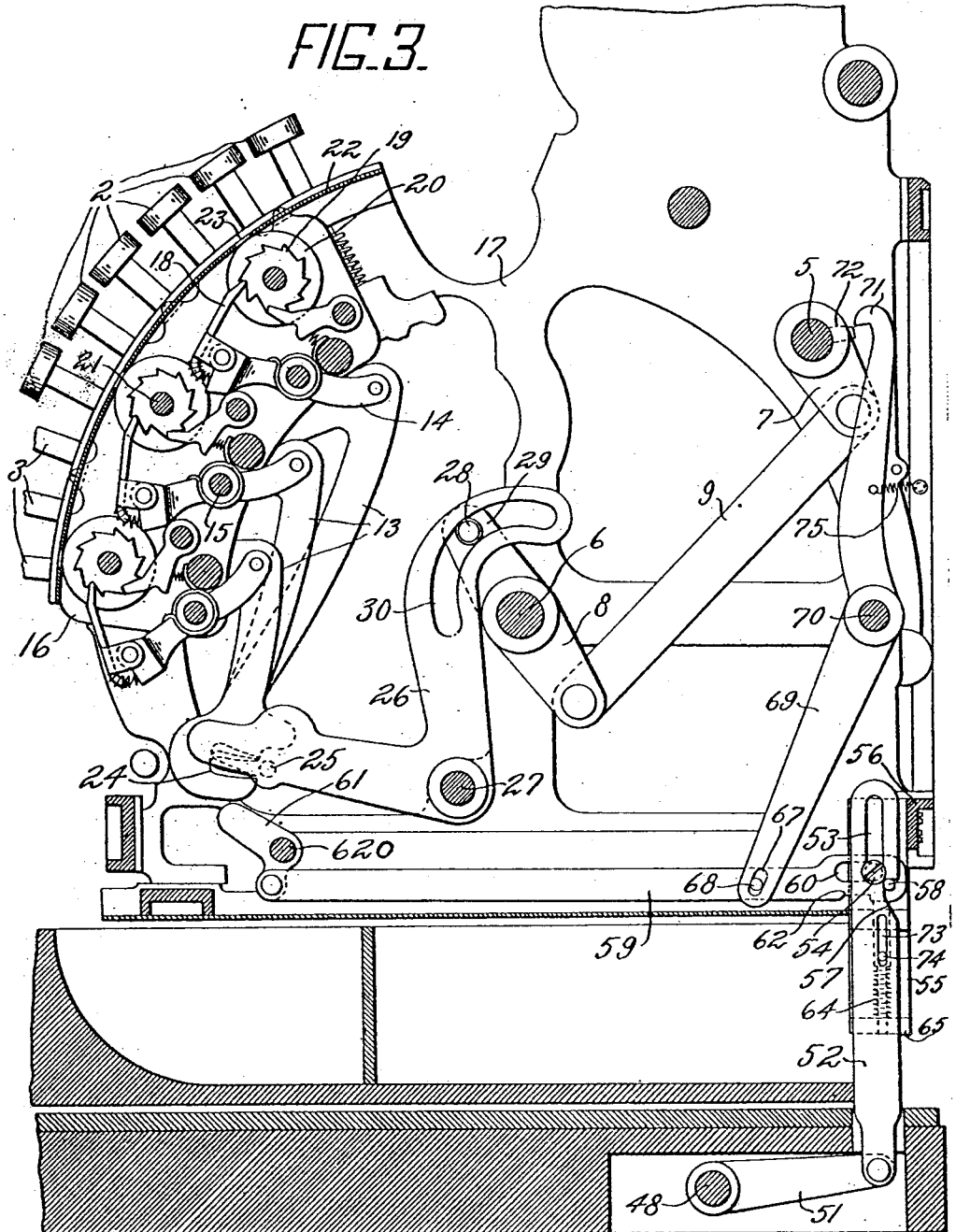

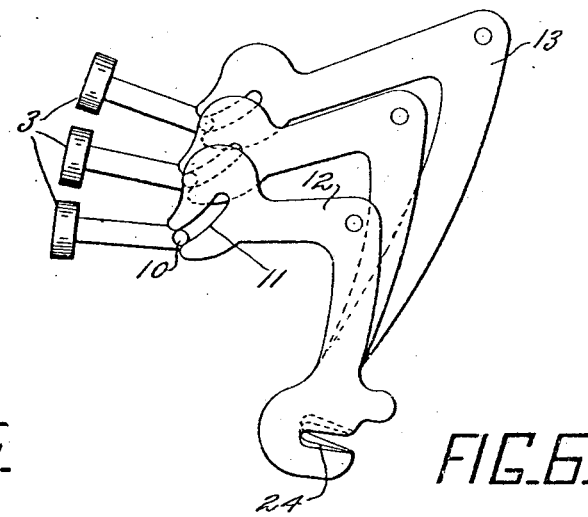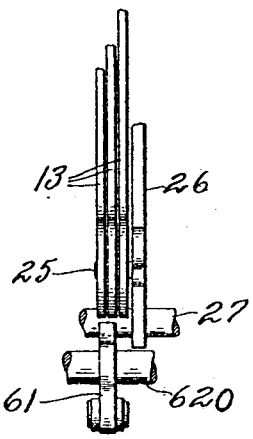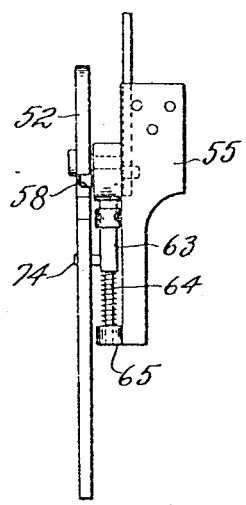

UNITED STATES PATENT OFFICE.

WILLIAM H. MUZZY AND FREDERICK L. FULLER, OF DAYTON, OHIO, ASSIGNORS TO THE NATIONAL CASH REGISTER COMPANY, OF DAYTON, OHIO, A CORPORATION OF OHIO, (INCORPORATED IN 1906.)

ATTACHMENT FOR CASH-REGISTERS.

1,161,069.  Specification of Letters Patent.  Patented Nov. 23, 1915.

Application filed February 20, 1911. Serial No. 609,554.

*To all whom it may concern:*

Be it known that we, WILLIAM H. MUZZY and FREDERICK L. FULLER, citizens of the United States, residing at Dayton, in the county of Montgomery and State of Ohio, have invented certain new and useful Improvements in Attachments for Cash-Registers, of which we declare the following to be a full, clear, and exact description.

In its broader aspects this invention relates to connecting or interlocking mechanism between structurally separate devices or machines, whereby when one of the machines is operated to perform certain functions, it is locked or rendered inoperative at the end of said operation, and is unlocked or rendered operative only upon the operation of the other device or machine. Furthermore, this interlocking or connecting mechanism is so constructed that the first mentioned machine may be repeatedly operated without an intervening operation of the second machine or device.

In the specific embodiment of this invention the interlocking mechanism has been shown as connecting a cash register or accounting machine and a filing cabinet which are of forms well known on the market.

When the accounting machine is operated for the purpose of entering "charge" or "received on account" transactions therein, the machine is automatically locked at the end of the operation and remains in such condition until the filing cabinet is operated, which operation will automatically release the accounting machine. In the entering of "cash" and "paid out" transactions the above mentioned locking mechanism for the accounting machine is not brought into play, therefore permitting successive operations of the machine without an intervening operation of the filing cabinet. In the specific embodiment of the invention, the arrangement described is very desirable, as frequently in an establishment where the two devices or machines are in use, a clerk after making a "charge" transaction or receiving cash on account, may make the proper entries upon the loose leaf system which is in universal use and then deposit the leaf or slip in the filing cabinet without making the proper entry in the accounting machine. With the described invention in use this is impossible, as the slip receptacle or filing cabinet remains locked until either a "received on account" or a "charge" transaction is entered in the accounting machine.

With these and incidental objects in view the invention consists in certain novel features of construction and combinations of parts the essential elements of which are set forth in the appended claims and a preferred form of embodiment of which is hereinafter shown with reference to the drawings which accompany and form part of this specification.

Figure 1 is a perspective view of the accounting machine and filing cabinet used in the specific embodiment of this invention. Fig. 2 is a side elevation of the invention, showing the filing cabinet or slip receptacle partly in section. Fig. 3 is a transverse sectional view through the accounting machine, showing the special counters and a part of the interlocking mechanism. Fig. 4 is a detail view of the special transaction keys and bell crank levers for operating the special counters which are positioned by said keys. Fig. 5 is a front elevation of the bell crank levers shown in Fig. 4 and mechanism coöperating therewith. Fig. 6 is a rear elevation of the part of the interlocking mechanism which is located in the accounting machine.

The cash register shown in the drawings is of the type shown and described in the patent granted to Cleal and Reinhart April 13, 1897 and numbered 580,378. The machine as shown comprises three banks of amount keys 1 and an additional bank which is provided with clerks' initial keys 2 and special transaction keys 3. As shown in this patent the amount keys control differential mechanism which in turn actuates the totalizing, indicating and printing mechanisms, while the clerks' keys and the special transaction keys control devices for indicating and printing only. Power is applied to the machine by a crank handle 4, which through suitable intervening gearing, not shown, rotates a shaft 5 (Fig. 3) through a complete rotation upon each operation of the machine. This shaft 5 is connected to a shaft 6 by arms 7 and 8 and a link 9. Upon each operation of the shaft 5, the shaft 6 will be rocked, first in an anti-clockwise direction to an extent of about 90°, and then back to its normal position.

The special keys 3 (Figs. 3 and 4) are provided with key pins 10 which play in elongated slots 11 formed in horizontal arms 12 of bell crank levers 13, which levers are pivoted to levers 14. The levers 14 are centrally pivoted upon rods 15 suitably mounted within an auxiliary frame 16, which in turn is mounted between two of the intermediate frames 17 of the machine. The forward ends of the centrally pivoted levers 14 carry multi-prong pawls 18 which are arranged to engage with ratchet wheels 19, secured to the sides of counter wheels 20 and which are loosely mounted upon transverse shafts 21, the latter being suitably mounted in an auxiliary frame 16. A plate 22 is attached to the auxiliary frame 16 and passes over the counter wheels 20. This plate is provided with apertures 23 through which the numbers on the counter wheels may be read. At the extreme lower ends of the downwardly extending arms of the bell crank levers 13 slots 24 are provided. Whenever one of the special keys is depressed the lever 13 coöperating therewith will be rocked in an anti-clockwise direction so that the slot 24 formed in the lower end of said lever will pass around a pin 25 extending laterally from the forward end of the horizontal arm of a bell crank lever 26, which is pivoted upon a rod 27 suitably mounted in the frames 17 of the machine.

Upon the rotation of the shaft 5, a pin 28, projecting from an arm 29 secured to the rock shaft 6, and into a cam slot 30 formed in the upper end of the vertical arm of the lever 26, will rock this lever in an anti-clockwise direction, by which movement the pin 25 carried by the lever will lower the lever 13 of the operated key. By this movement the lever 14, to which the operated lever 13 is connected, will be rocked about its pivot 15 thereby actuating the units wheels of the special counter corresponding to the operated key. By this operation it will be seen that upon the operation of any one of the special keys 3, one unit will be added to the corresponding counter, so that a correct account will be kept of the number of the different special transactions entered in the machine. This counter construction is well known in the art, and no further description of it need be given.

The filing cabinet or slip receptacle, as shown in Figs. 1 and 2, comprises a plurality of trays 31, which are pivoted to a plate 32 secured to a false back 33 of the cabinet. The trays 31 are arranged in sections and each tray of the various sections rests upon the tray immediately below it so that when any one of the trays is elevated by its projecting flange 34 all of the trays above it will be elevated or rocked about their pivots. Each tray is provided with a bail 35, which, when the tray is elevated, will automatically fall into position to support the tray in its elevated position.

Immediately above the uppermost tray 31 of each section is a plate 36 which normally closes the space above the upper tray of each section. Each of these plates at its lower end is provided with a bail 37, the free ends of which are secured in the partitions 38 of the filing cabinet and thereby act as a pivot for said plate.

Plates 39, only one of which is shown, are secured to the partitions 38 of the filing cabinet and these plates are provided with cam slots 40 into which project the ends of a rod 41 which extends through flanges 42 of each of the face plates 36. The lower end of this face plate 36 rests upon the upper tray 31 so that when any one of the trays is lifted this face plate will also be lifted. The shape of the cam grooves 40 of the plates 39 is such that as each of the face plates 36 is lifted the upper end of said plate will move rearwardly after being slightly elevated. Each face plate 36 is provided with a flange similar to the flanges 34 of the trays 31 by which said face plate may be elevated when it is desired to expose the uppermost tray.

As thus far described, the accounting machine and the filing cabinet are of well known forms, and have been placed upon the market in large quantities, and it is thought that from the above description the operation of both of these devices will be generally understood. The filing cabinet is of the type shown and described, in an application of William H. Muzzy, filed October 18, 1906, Serial No. 339,539, and for a further description thereof reference may be had to said application, though the description just given is sufficient for an understanding of the present invention.

With this general description of the operation of the different devices, the description of the connecting or interlocking mechanism between said devices will be next taken up. This connecting or interlocking mechanism between the accounting machine and the filing cabinet is of such construction, that when certain transactions are entered in, or certain functions performed by the accounting machine, it becomes necessary to operate the filing cabinet before a subsequent operation can be made on the accounting machine.

Supported by the flanges 42, of the face plate 36 (see Fig. 2) of each tray section of the filing cabinet, is a rod 43 with which the forward end of a lever 44 contacts. This lever is secured at its rear end to a shaft 45 suitably mounted in the frame work of the filing cabinet. It is to be understood that there is one of these arms 44 for each section of the filing cabinet, and that the said cabinet may be of as many sections as desired. Projecting forwardly from and fast on one end of the shaft 45 is an arm 46 to the forward end of which is connected a downwardly extending link 47, which at its lower end is connected to a transverse shaft 48 by an arm 49. This shaft 48 extends through a base plate 50 upon which both the filing cabinet and the accounting machine are mounted. Extending rearwardly from the shaft 48 is an arm 51 (see Figs. 2 and 3) to the rear end of which is secured the lower end of a slide 52, the upper end of said slide being provided with an elongated slot 53, through which extends a screw 54 projecting from a plate 55, which is fastened to a tie bar 56 located in the rear of the accounting machine. At the rear edge of the slide 52 and near its upper end is a notch 57, in which normally rests a pin 58 projecting from the rear end of a slide 59. This slide 59 at its rear end is also provided with an elongated slot 60, through which the screw 54 extends and at its forward end the said slide is connected to a bell crank lever 61, which is pivoted upon a rod 620 suitably secured in the machine frames 17. The horizontal arm of the lever 61 is located immediately below and in the path of the downward movement of the bell crank levers 13 which coöperate (see Fig. 5) with the "received on account" and "charge" special keys 3; these keys being the second and third from the bottom of the special bank of keys.

It is to be noted that in the normal positions of the parts, as shown in Fig. 3, no slip receptacle may be opened. This follows from the fact that the opening of any receptacle compels an elevation of arms 44 and consequent depression of slide 52. However, slide 52 is locked in elevated position normally by the engagement of pin 58 on slide 59 with the upper edge of notch 57 in slide 52. To withdraw pin 58 requires an operation of either the "received on account" or the "charge" key of the accounting machine.

It will be recalled that upon the depression of any one of the spacial keys 3 and the operation of the crank handle 4 of the accounting machine, the lever 15, coöperating with the pressed special key, will be lowered by the pin 25 of the bell crank 26. Upon the owering of the lever 13 coöperating with ther the "received on account" or "charge" key, the lever 61 will therefore be rocked in an anti-clockwise direction, which movement will carry the slide 59 rearwardly, so that the pin 58 projecting from the rear end of said slide will pass from under the shoulder formed by the notch 57 in the rear edge of the slide 52. The lower edge of the slide 59 is provided with a notch 62 into which a plunger 63 is forced by a spring 64 (see Figs. 3 and 6) when the slide 59 reaches its rearmost position. This plunger 63 is guided by flanges 65 extending from the plate 55.

When the slide 59 is latched in its rearmost position by the plunger 63, the shafts 45 and 48 are free to be rocked by the rods 43 carried by the face plates 36 of the different tray sections against the tension of a coil spring 66 upon the exposure of any of the trays or slip receptacles. The ends of the spring 66 are secured to the arm 46 and one of the partitions 38 of the filing cabinet.

The rearward movement of the slide 59, caused by the lowering of the levers 13 which coöperate with the special keys "Charge" and "Received on account", will, through a slot and pin connection 67 and 68 respectively, rock a lever 69 in an anti-clockwise direction about a rod 70 as its pivot. The upper end of the lever 69 is provided with a hook portion 71, which passes over a pin 72 projecting from the main shaft 5 when said lever 69 is rocked by the rearward movement of the slide 59, in which position of the lever, the shaft 5 will be prevented from rotating until the lever 69 is returned to its normal position, as shown in Fig. 3, which movement is accomplished upon the exposing and concealing of one of the receptacle trays.

As previously described the face plates 36 have a slight upward movement when any one of the trays of that section is elevated, which upward movement will through rod 43 elevate the forward end of its companion arm 44, thereby rocking the shaft 45 in a clockwise direction and through the arms 46 and 49 and the link 47 rock the shaft 48 in a similar direction. This movement of the shaft 48 will draw the slide 52 downwardly and near the end of its downward movement the upper end of a slot 73 formed in said slide will contact with a pin 74 projecting from the plunger 63 and move said plunger out of the notch 62 in the slide 59. The slide 59 will be prevented from returning to normal position by the contact of pin 58, which projects from said slide, with the rear edge of the slide 52. When, however, slide 52 has been moved downward to an extent sufficient to withdraw the plunger 63 from the notch 62 the slide 59 will move forward slightly under the action of spring 75 so as to cause the rear wall of the notch 62 to pass above the plunger 63 thus to prevent the plunger again entering the notch when the slide 52 is restored as follows. When the trays are returned to their normal concealing positions the shafts 45 and 48 will be rocked in an anti-clockwise direction by the spring 66 by which movement the slide 52 will be fully elevated, thereby presenting the recess 57 to the pin 58 of the slide 59 and permitting the latter to be fully returned to its normal position, as shown in Fig. 3, this return being caused by a spring 75 having its ends connected to the lever 69 and to the machine frame.

Bearing against the ends of the rod 41 carried by the flanges 42 of each face plate 36 (see Fig. 2) are arms 76, only one of which is shown, and which are pivoted to the partitions 38 at the same point as the bails 37, which are also connected to the face plates 36. Each of the arms 76 has an extension 77 which projects below the pivotal point and to which one end of a spring 78 is fastened, the other end of said spring being fastened to the false back 33. These springs assist in the return of the face plates 36 to their normal positions, which are shown in Figs. 1 and 2.

With the construction as above described it will be plainly seen that it is impossible to gain access to the trays of the filing cabinet without first depressing either the "charge" or "received on account" keys and then operating the accounting machine, after which it is impossible again to operate the machine until the filing cabinet is operated. It is also evident that the locking mechanism does not come into operation when either a "cash" or a "paid out" transaction is entered in the machine and consequently transactions of either of these classes may be repeatedly entered in the machine without an intervening operation of the slip receptacle or filing cabinet.

While this connecting or interlocking mechanism has been shown for the purpose of requiring a certain sequence of operations between an accounting machine and a credit cabinet when certain transactions are entered in the machine, it is not intended to limit the use of this interlocking mechanism to this adaptation as it may be used with equal facility between other types of machines.

While the form of mechanism herein shown and described is admirably adapted to fulfil the objects primarily stated it is to be understood that it is not intended to confine the invention to the one form of embodiment herein shown and described but that it is susceptible of embodiment in various forms all coming within the scope of the claims which follow.

What is claimed is:—

1. The combination with structurally separate mechanisms or devices, of means rendered effective by an operation of one of said devices for preventing subsequent operations of said devices without an intervening operation of the other device when the first mentioned device is operated in a certain manner, and means for holding the preventing means in an inoperative condition when the first mentioned device is operated in a different manner.

2. The combination with structurally separate mechanisms or devices, of means requiring an operation of one of the devices between successive operations of the other device when the latter is operated to perform certain functions, while permitting repeated operations of the second mentioned device without an intervening operation of the first mentioned device when the second mentioned device is operated to perform different functions.

3. The combination with an accounting machine having manipulative devices for controlling the entry of different classes of transactions therein, of a slip receptacle, means normally locking the slip receptacle from operation, mechanism operated when transactions of a certain class are entered in the accounting machine for operating the locking means for the slip receptacle, and means preventing a second operation of the accounting machine until the slip receptacle is operated.

4. The combination with an accounting machine having manipulative devices for controlling the entry of different classes of transactions therein, of a slip receptacle, means normally locking the slip receptacle from operation, mechanism operated by the accounting machine when certain of the manipulative devices have been manipulated for unlocking the slip receptacle, and means, controlled by the slip receptacle, for preventing a second operation of the accounting machine when operated in such manner until the slip receptacle is operated.

5. The combination with an accounting machine having manipulative devices for controlling the entry of different classes of transactions therein, of a slip receptacle, means normally locking the slip receptacle from operation, mechanism operated when transactions of a certain class are entered in the accounting machine for operating the locking means for the slip receptacle and for locking the accounting machine from a second operation, and means controlled by the slip receptacle for actuating the locking mechanism of the accounting machine.

6. The combination with an accounting machine having manipulative devices for controlling the entry of different classes of transactions therein, of a receptacle for slips comprising a plurality of exposable trays, means normally locking the trays of the slip receptacle from operation, mechanism operated when transactions of a certain class are entered in the accounting machine for unlocking the trays of the slip receptacle, and means controlled by the receptacle trays for preventing a second operation of the accounting machine until one of the trays is exposed.

7. The combination with an accounting machine having manipulative devices for controlling the entry of different classes of transactions therein, of a slip receptacle, and connecting mechanism between the accounting machine and the slip receptacle for compelling alternate operations of the accounting machine and slip receptacle when transactions of a certain class are entered in the accounting machine.

8. The combination with an accounting machine having manipulative devices for controlling the entry of different classes of transactions therein, of a slip receptacle including a plurality of exposable trays, and connecting mechanism between the accounting machine and the slip receptacle for preventing a second operation of the accounting machine until a tray of the slip receptacle is exposed when transactions of a certain class are entered in the accounting machine.

9. The combination with an accounting machine having manipulative devices for controlling the entry of different classes of transactions therein, of a slip receptacle including a plurality of exposable trays, means normally preventing the exposure of said trays, mechanism operated when transactions of a certain class are entered in the accounting machine for operating the exposure preventing means and for locking the accounting machine from a second operation, and means actuated upon the exposure of any one of the trays for operating the locking mechanism of the accounting machine.

10. The combination with an accounting machine having manipulative devices for controlling the entry of different classes of transactions therein, of a slip receptacle, and means, brought into operation when transactions of a certain class are entered in the accounting machine, for preventing successive operations of said machine without an intervening operation of the slip receptacle, the said means permitting successive operations of the accounting machine without an intervening operation of the slip receptacle when transactions of other classes are entered in the accounting machine.

11. The combination with an accounting machine having manipulative devices for controlling the entry of different classes of transactions therein, of a slip receptacle including a plurality of exposable trays, means normally preventing the exposure of said trays, mechanism operated when transactions of a certain class are entered in the accounting machine for releasing the tray exposure preventing means, a latch for holding the releasing mechanism in its operated position, and means actuated upon the exposure of any one of the trays for releasing the latch.

12. The combination with an accounting machine having manipulative devices for controlling the entry of different classes of transactions therein, of a slip receptacle including a plurality of exposable trays, means normally preventing the exposure of said trays, mechanism operated when transactions of a certain class are entered in the accounting machine for releasing the tray exposure preventing means, means, actuated by the operation of the releasing means, for locking the accounting machine from a second operation, and means actuated by the exposing and concealing of any tray for operating the locking means for the accounting machine.

13. The combination with structurally separate mechanisms or devices, one normally inoperable, of means rendered effective by an operation in a certain manner of the other of said devices for rendering said first device operable and preventing subsequent operations of said second device until said first device is operated.

14. The combination with structurally separate mechanisms or devices, of means rendered effective by an operation of one of said devices for preventing subsequent operations of said device without an intervening operation of the other device when the first mentioned device is operated in a certain manner.

15. The combination with an accounting machine having manipulative devices for controlling the entry of different classes of transactions therein, of a locking means for said accounting machine normally ineffective, a receptacle for slips, locking means normally effective to lock said slip receptacle from operation, means controlled by certain of said manipulative devices and operable on an operation of the accounting machine to render the first of said locking means effective and the other of said locking means ineffective, and means controlled by an operation of the slip receptacle for restoring both of said locking means to normal condition.

16. The combination with an accounting machine having a main operating mechanism and manipulative devices for controlling the entry of different classes of transactions, a lock for the main operating mechanism rendered effective upon an operation of the machine to enter certain classes of transactions, latching means for holding said locking means in locking position, a slip receptacle, normally effective means preventing an operation of the slip receptacle, connections for disabling said preventing means whenever the locking means of the accounting machine is rendered effective and for disabling said latching means upon an operation of the slip receptacle.

17. The combination with structurally separate mechanism or devices; of means rendered effective by an operation of one of said devices for preventing subsequent operations of said device without an intervening operation of the other device when the first mentioned device is operated in a certain manner, yet not affecting operations in other manners of the first mentioned device.

18. The combination of an accounting machine having manipulative devices for controlling the entry of different classes of transactions therein; a slip receptacle; means normally locking the slip receptacle from operation; mechanism operated when certain kinds of transactions are entered in the accounting machine for operating the locking means for the slip receptacle, and means preventing a second operation of the accounting machine until the slip receptacle is operated.

19. The combination of an accounting machine having manipulative devices for controlling the entry of different classes of transactions therein; a slip receptacle; a connecting mechanism between the accounting machine and the slip receptacle for compelling alternate operations of the accounting machine and slip receptacle when certain kinds of transactions are entered in the accounting machine.

20. In a machine of the class described, the combination with a register operating mechanism, of a normally inaccessible account file, means controlled by the register operating mechanism for rendering said file accessible, and a lock for the operating mechanism rendered effective by operation of the operating mechanism and released by opening the account file.

21. In a machine of the class described, the combination with a register operating mechanism, of an account file, locking devices normally preventing said file from being opened, means controlled by the register operating mechanism for releasing said locking devices and permitting the opening of the account file, and means preventing subsequent operation of the operating mechanism until after the account file has been opened.

22. In a machine of the class described, the combination with a register operating mechanism, of an account file, locking devices normally preventing access to said file, means requiring an operation of the register operating mechanism for releasing said locking devices and permitting the opening of the account file, and means preventing subsequent operation of the operating mechanism until after the account file has been opened.

23. In a machine of the class described, the combination with a register operating mechanism, of an account file, a lock for the operating mechanism normally under the control of said mechanism, and means whereby operation of the operating mechanism transfers control over said lock to the account file.

24. In a machine of the class described, the combination with a register operating mechanism, of a series of account receptacles, locking devices normally preventing said receptacles from being opened, means controlled by the operating mechanism for releasing said locking devices and permitting the opening of any desired receptacle, and means preventing a second operation of the operating mechanism until after an account receptacle has been opened.

25. In a machine of the class described, the combination with register operating mechanism, of a plurality of receptacles, means normally locking said receptacles against exposure, means requiring an operation of the register operating mechanism for releasing said locking means and rendering the receptacles exposable, locking devices rendered effective by operation of the operating mechanism to prevent subsequent operation of said mechanism, and means requiring the exposure of a receptacle for releasing said locking devices.

26. In a machine of the class described, the combination with a series of normally inaccessible account receptacles, of a register operating mechanism, said mechanism having a series of keys representing the classes of transactions to be entered in said account receptacles, and means requiring an operation of the register operating mechanism involving one of said keys for rendering the account receptacles accessible, said means not being affected by operations in which said keys are not used.

27. In a machine of the class described, the combination with a series of normally inaccessible account receptacles, of a register operating mechanism, said mechanism having a series of keys representing the classes of transactions to be entered in said account receptacles, means requiring an operation of the register operating mechanism involving one of said keys for rendering the account receptacles accessible, said means not being affected by operations in which said keys are not used, a lock for the operating mechanism rendered effective by operating said mechanism as first mentioned, and means whereby said lock is released by opening the account receptacles.

28. In a machine of the class described, the combination with a normally closed and locked receptacle, of a register operating mechanism, means whereby said receptacle may be unlocked by operation of the operating mechanism, locking devices for the operating mechanism rendered effective by an operation of said mechanism, and means whereby said locking devices are released by opening the receptacle.

29. In a machine of the class described the combination with a plurality of accounting devices, of a common operating mechanism therefor, a plurality of manipulative devices for establishing coöperative relation between any desired accounting device and the operating mechanism, a slip receptacle, locking devices normally preventing access to said receptacle, and devices controlled by certain of the aforesaid manipulative devices whereby said locking devices may be released by operation of the accounting device operating mechanism, said locking devices not being affected by operations involving other manipulative devices.

In testimony whereof we affix our signatures in the presence of two witnesses.

WILLIAM H. MUZZY.
FREDERICK L. FULLER.

Witnesses:
Roy C. Glass,
Carl W. Beust.